US011432095B1

(12) United States Patent
Satongar et al.

(10) Patent No.: US 11,432,095 B1
(45) Date of Patent: Aug. 30, 2022

(54) PLACEMENT OF VIRTUAL SPEAKERS BASED ON ROOM LAYOUT

(71) Applicant: Apple Inc., Cupertino, CA (US)

(72) Inventors: Darius A. Satongar, Santa Clara, CA (US); Martin E. Johnson, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 15 days.

(21) Appl. No.: 16/847,443

(22) Filed: Apr. 13, 2020

Related U.S. Application Data

(60) Provisional application No. 62/854,195, filed on May 29, 2019.

(51) Int. Cl.
H04S 7/00 (2006.01)
H04R 5/02 (2006.01)
G06F 3/01 (2006.01)
H04R 1/10 (2006.01)

(52) U.S. Cl.
CPC .............. H04S 7/301 (2013.01); G06F 3/012 (2013.01); H04R 5/02 (2013.01); H04S 7/304 (2013.01); H04R 1/1008 (2013.01)

(58) Field of Classification Search
CPC .. H04S 2400/11; H04S 2420/01; H04S 7/304; H04S 2400/15; H04S 7/303; H04S 7/307; H04S 3/008; H04S 7/302; H04S 2400/01; H04S 2420/03; H04S 7/301; H04S 1/005; H04S 2400/03; H04S 2400/13; H04S 2420/11; H04S 7/30; H04S 1/007; H04S 3/002; H04S 7/305; H04S 7/306; H04S 3/00; H04S 7/308; H04R 5/033; H04R 5/04; H04R 5/02; H04R 2420/07; H04R 2205/022; H04R 2227/003; H04R 27/00; H04R 3/04; H04R 3/005; H04R 1/1008; H04R 1/1091; H04R 2499/13; H04R 2499/15; H04R 1/1041; H04R 2201/401; H04R 2203/12; H04R 2400/03; H04R 2400/11; H04R 2430/23; H04R 2460/13; H04R 2499/11; H04R 3/14; H04R 5/023; H04R 5/027; H04R 1/1016; H04R 1/1075; H04R 1/1083; H04R 2227/005; H04R 3/002; H04R 9/06
USPC ..... 381/310, 150, 345, 337, 74, 182; 700/94
See application file for complete search history.

(56) References Cited

U.S. PATENT DOCUMENTS

| 2013/0216047 | A1* | 8/2013 | Kuech ..... | H04R 5/00 381/26 |
| 2015/0016642 | A1* | 1/2015 | Walsh ..... | H04S 7/301 381/307 |
| 2018/0192227 | A1* | 7/2018 | Woelfl ..... | H04S 7/304 |
| 2018/0352360 | A1* | 12/2018 | Chen ..... | G06F 3/165 |
| 2019/0253801 | A1* | 8/2019 | Arteaga ..... | H04R 5/027 |

(Continued)

Primary Examiner — Lun-See Lao
(74) Attorney, Agent, or Firm — Womble Bond Dickinson (US) LLP

(57) ABSTRACT

Virtualizing speakers for a headphone set can include determining a location of a display. Locations of one or more virtual speakers can be assigned based on the location of the display. A first virtual speaker can be located at the display. A position of a head of a user can be tracked. Audio content can be spatialized with a spatial renderer to generate spatialized audio signals, based on the tracked position of the head and the locations of the virtual speakers. Other aspects are also described and claimed.

20 Claims, 5 Drawing Sheets

(56) References Cited

U.S. PATENT DOCUMENTS

2020/0084560 A1* 3/2020 Satongar .................. H04B 3/23
2020/0322727 A1* 10/2020 Smyth ....................... H04S 5/00

* cited by examiner

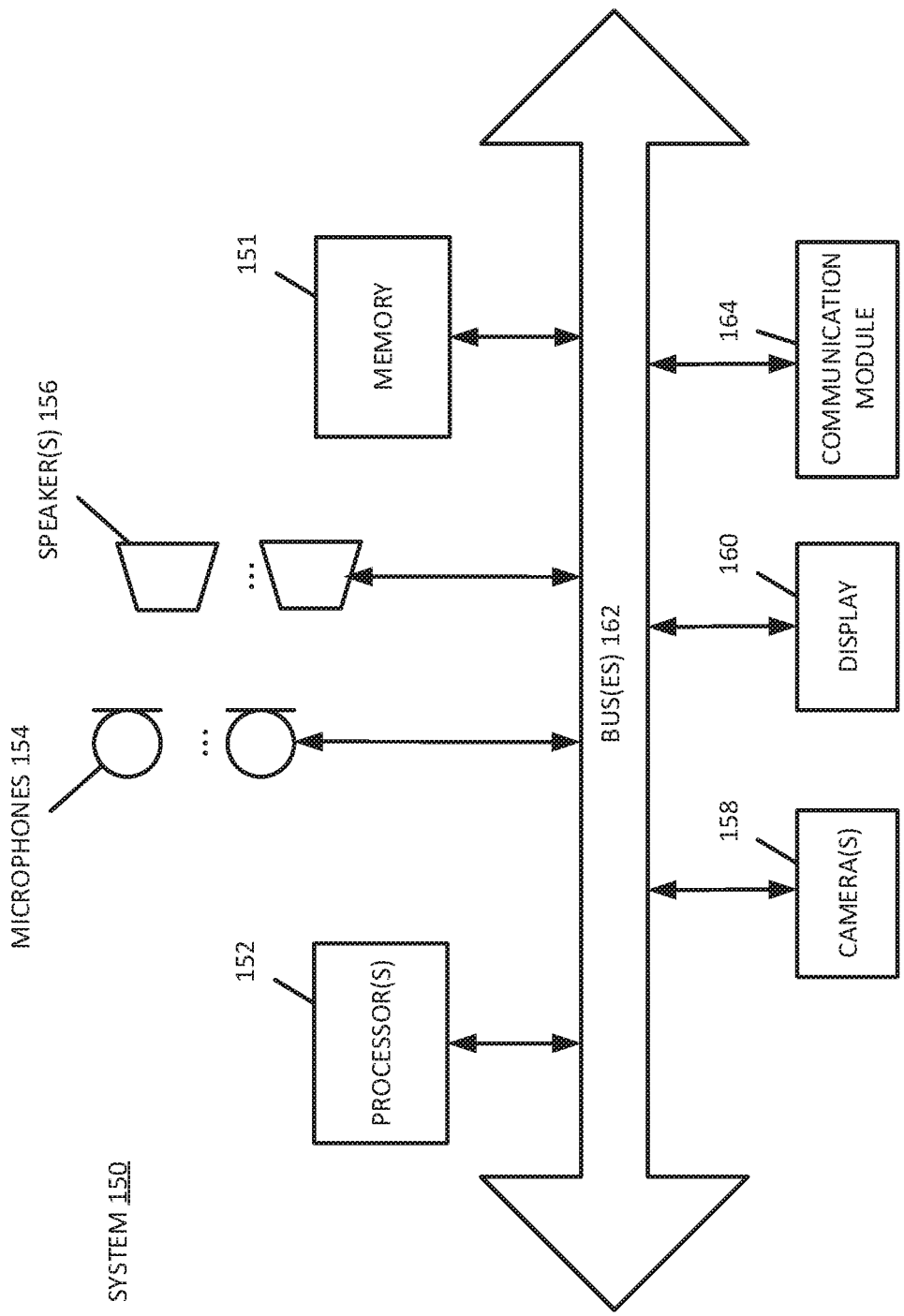

US 11,432,095 B1

PLACEMENT OF VIRTUAL SPEAKERS BASED ON ROOM LAYOUT

FIELD

One aspect of the disclosure herein relates to audio processing with virtual speakers.

BACKGROUND

Audio signals can be used to drive loudspeakers. Loudspeakers can be placed in different locations (e.g., in an entertainment room or living room) to provide an immersive audio experience. Different audio formats, such as 5.1 or 7.1, can prescribe different arrangements of speakers in a listening area. Alternatively, audio signals can be used to drive speakers of a headphone set. The audio signals can be spatialized to provide an immersive experience for users.

SUMMARY

Speakers can be virtualized through playback on a headphone set. For example, if a user watches a movie with a headphone set on, movie audio that is played through the headphone set can be virtualized so that the user perceives sound to be coming from virtualized speakers with set positions located around the user.

Locations of the virtual speakers can be tailored to a user's setup, for example, a television size, television location, and listening area (which can include geometry of a room that the television is located). An estimated location of the user can also factor into where the speakers are placed. For example, if a user's sitting position can be estimated, then virtual speakers that might be dedicated to surround sound can be placed at the user's side or behind the user. Based on analysis of such factors, locations of virtual speaker locations can be assigned and/or optimized in a manner that provides a positive experience to the user.

In one aspect, a method of virtualizing speakers (e.g., for playback on a headphone set) can include: determining a location of a television; assigning one or more locations of one or more virtual speakers based on the location of the television, wherein the one or more virtual speakers include a first virtual speaker located at the television; determining, in real-time (e.g., continuously and concurrently with the playback of the spatialized audio signals), a position of a head of a user; and spatializing, based on the position of the head and the one or more locations of the one or more virtual speakers, one or more audio signals with a spatial renderer to generate spatialized audio signals that, when used to drive a left speaker and a right speaker of a headphone set, are converted to sound that is perceived by the user to be located at the one or more locations of the one or more virtual speakers.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 6 illustrates an example of audio system hardware.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Process for Virtualizing Speakers for a Headphone Set

Figure 1:
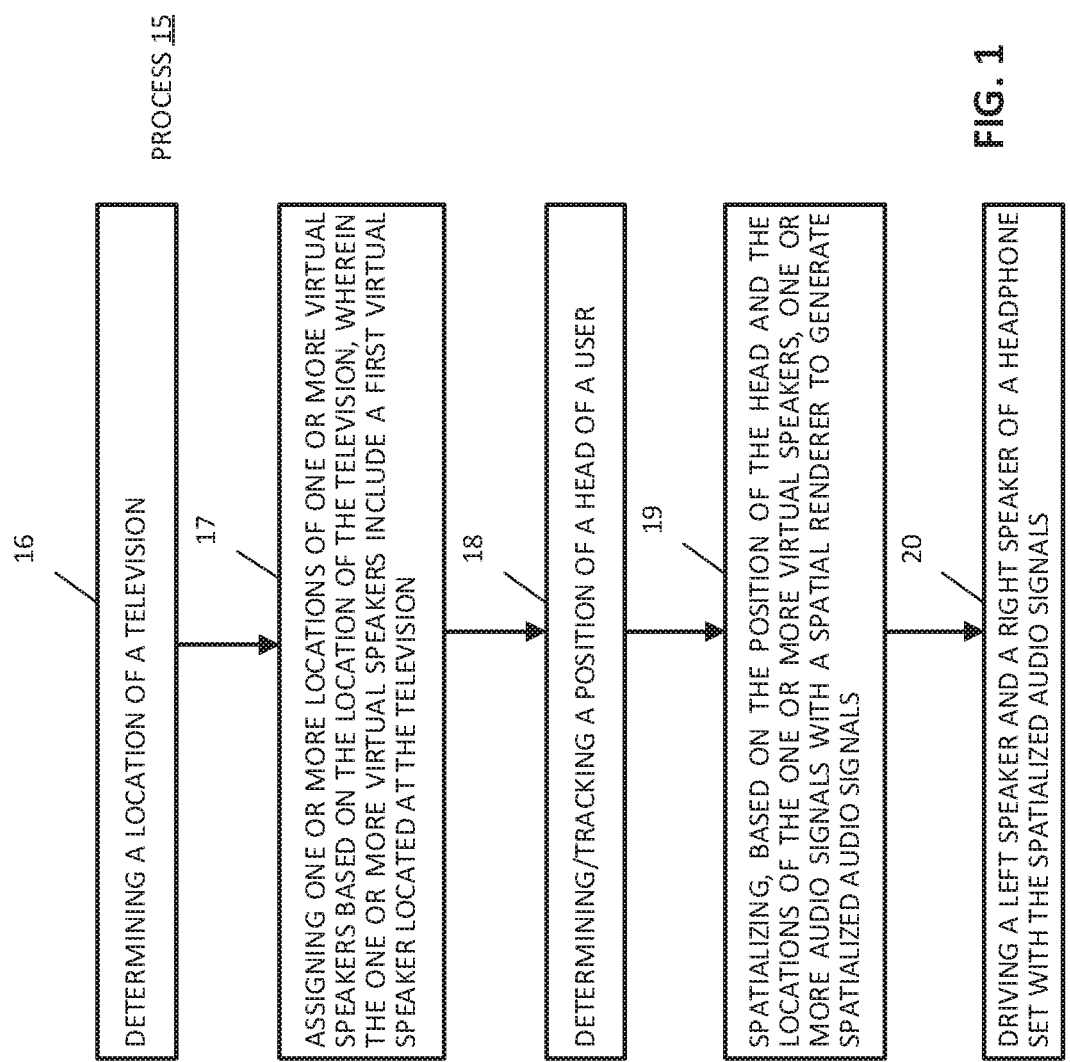
FIG. 1 illustrates a process for virtualizing speakers, according to one aspect.

Referring now to FIG. 1, a process or method 15 of virtualizing speakers for a headphone set is shown. A headphone set can be any headworn device having a left and right speaker. Such a device can have speakers that are worn in-ear, over-ear, on-ear, or extra-aural. The device can include a head-mounted display (HMD) or 'smart' glasses, e.g., where speakers are located on temples of the glasses.

At block 16, the process includes determining a location of a television. In one aspect, the location of the television is determined based on one or more images generated by a camera. The camera can be integrated with the headphone set worn by the user, or a separate camera. The one or more images can be processed with an image processing algorithm to recognize the television in the one or more images. Image processing algorithms include computer vision techniques such as object recognition, edge detection, surface detection, pattern recognition and one or more trained neural networks.

In one aspect, when determining the location of the television, an image (e.g., a pattern) can be displayed on the television. The image processing algorithm can better recognize and localize the television in the one or more images and better determine the dimensions of the television. For example, referring briefly to FIG. 5, a media player or server 90 can communicate to the television (e.g., via HDMI, video lines, WiFi, or other known communication means) a stream of data representing a calibration image that the television processes and displays. A sensor (84, 89, or 93) can generate one or more images (e.g., calibration images) of the listening area (e.g., an entertainment room, living room, a backyard, a bed room, etc.) where the television is located.

An image processor, which can be using one or more image processing algorithms, can be configured to recognize the calibration image or pattern in the one or more calibration images. For example, the image/pattern can be stored in local memory or otherwise accessed (e.g., over a network) and used as a reference during processing of images to more accurately recognize the television in the images (which can be a video feed) and characterize its dimensions.

In one aspect, at block 16, a map of the television environment can be generated based on one or more images. The map can include layout of a room, and/or objects in the room or environment where the television is located, including the location of the television in the room or environment. The map can define the geometry of the room (e.g. the dimensions and arrangement of the walls, ceiling, floor, hallways, doorways and windows) and include furniture and other room objects. This map can be used at block 17 to determine where to assign the one or more virtual speakers and optimize their locations. The locations can also be based on the configuration of the audio content (e.g., 5.1 surround, 7.1 surround, Dolby Atmos, etc.). Additionally or alternatively, the map can be used at block 18 as a reference to determine and track the position of the head of the user.

It should be understood that a 'television' can include other devices with display capabilities. Thus, for the present disclosure, a 'television' shall be regarded as interchangeable with a laptop having a display, a tablet computer, a projected display projected onto a surface by a projector, a computer monitor, or other devices with display means. All aspects discussed with regard to a 'television' also apply to these other forms of 'television'.

At block 17, the process includes assigning one or more locations of one or more virtual speakers based on the location of the television, wherein the one or more virtual speakers include a first virtual speaker located at the television. As mentioned above, a geometry of the room that the television is located (e.g. the dimensions and arrangement of the walls, ceiling, floor, hallways, doorways) and furniture, and other objects can be detected and determined based on one or more images (e.g., through computer vision). Dimensions of the television can be compared with the geometry of the room to optimize the one or more locations of the one or more virtual speakers. Those locations can be further optimized based on the furniture and other objects. For example, if a lamp sits between a user and a virtual speaker, the virtual speaker can be moved so that it sound does not appear to be coming from a lamp or book case.

Figure 3:
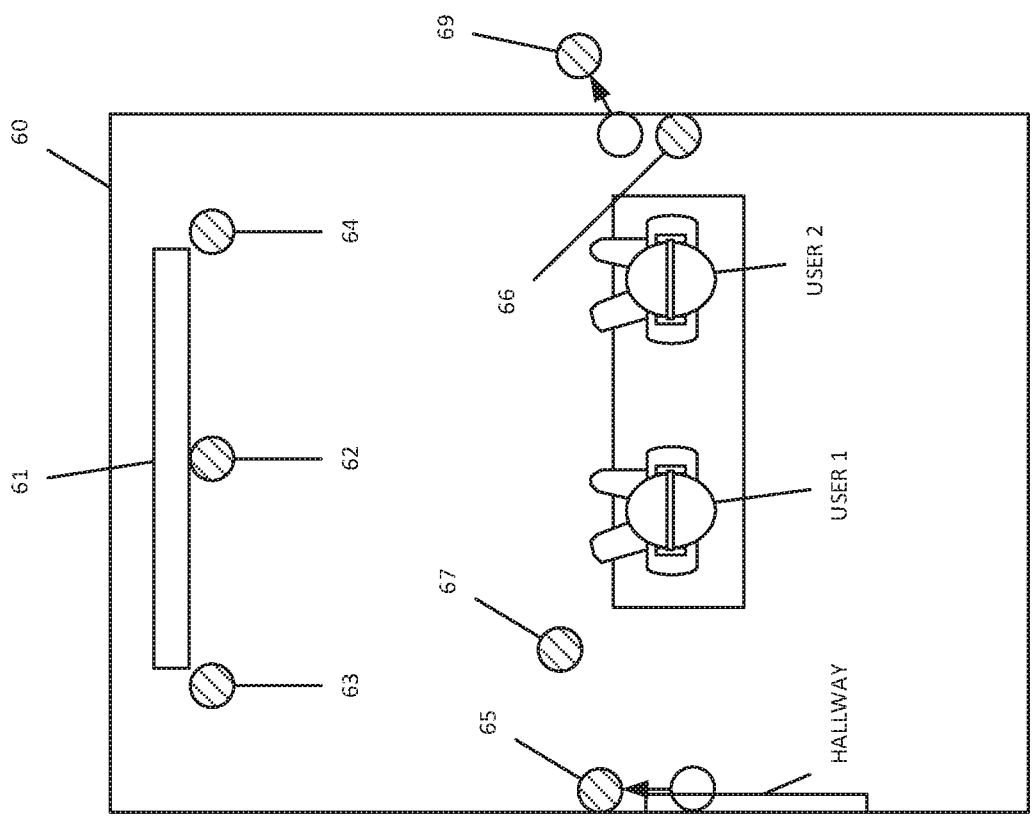
FIG. 3 illustrates features of virtual speakers in a listening area, according to one aspect.

Referring now to FIG. 3, a first virtual speaker 62 can be located at a center of the television 61. The first virtual speaker can be associated with a center channel of audio content (e.g., an audio track of a movie). In one aspect, a second virtual speaker 63 can be located at a right edge of the television and a third virtual speaker 64 can be located at a left edge of the television. The right virtual speaker can be associated with a right channel of the audio content and the left virtual speaker can be associated with a left channel of the audio content.

Different virtual speakers can be assigned to audio content channels based on a desired or existing audio configuration, for example, 5.1 surround sound, 7.1 surround sound, Dolby Atmos, or other predefined audio configurations. In one aspect, a user interface provides a selectable configuration to a user. In this case, the user can select an audio format and if the existing audio content (e.g., a soundtrack of a movie) is not the same as a selected audio format, then the audio content can be upmixed or downmixed to the user's selection.

Additionally or alternatively, virtual speakers can be generated to correspond to each audio channel of the existing audio content. For example, if the audio content for a movie is 5.1 surround, then virtual speakers can be generated for each channel of the audio content (e.g., center, front left, front right, surround left, surround right and low-frequency effects). Surround sound speakers can be optimized to be placed along walls (or near walls) of the room while front left, front right and center speakers can be placed at the television. The same can be said for 7.1 surround.

In one aspect, if a desired audio configuration is 5.1, the first virtual speaker can be located at a center of the television, a second virtual speaker can be located at a right edge of the television, a third virtual speaker can be located at a left edge of the television, a fourth virtual speaker can be located at a right side or behind an estimated location of the user, and a fifth virtual speaker can be located at a left side or behind the estimated location of the user. Furthermore, speakers can be located less traditionally in all directions around a user, for example, at various locations above, behind, or beside a user. Other features shown in FIG. 3 are discussed in other sections.

At block 18 of FIG. 1, the process includes determining, in real-time, a position of a head of a user. It should be understood that, in 'real-time' means that the user's head is tracked concurrent with the processing and playback of the video. In one aspect, a headphone set worn by the user can generate one or more images (e.g., a video stream) with one or more cameras.

In one aspect, the one or more cameras can be integral to the headphone set. The one or more cameras of the headphone set can include a stereo camera. The stereo camera can have a plurality of lenses, each lens having a separate image sensor, thereby providing the ability to capture three-dimensional images through stereo photography. The one or more images can be analyzed to determine a location and orientation of the user's head. This block be performed continuously to track the user head in real-time. Necessary adjustments can be made in spatializing the audio signals as the user's head changes in orientation or location. Orientation here can be understood to mean a turn and/or tilt of the head. The location can be understood to mean a three dimensional coordinate (e.g. along an X, Y, Z axis) in space.

The one or more images can be processed in real-time with a computer vision algorithm to recognize the television and use the television or other objects or patterns that are detected in the room to calculate a location and orientation of the user's head. The user's head can be tracked with known visual odometry and/or simultaneous localization and mapping (SLAM) algorithms that can include one or more of the following: particle filter, extended Kalman filter, Covariance Intersection, GraphSLAM. Other head tracking techniques and algorithms can also be used to track the user's head based on the one or more images.

In one aspect, visual information that is displayed on the television is also received by the head tracking processor and used as a reference to help recognize and pinpoint the television in the one or more images, when determining/tracking the position of the head. For example, if a media player is streaming movie content to a television and also processing image data from a headset to track the user's head, the media player can compare the known visual information that is being communicated to the television with the image data from the headset to better recognize the television. If the video frame of the movie contains a hero jumping out of a car, then the media player can know to look for a similar visual in the image data from the headset to find the television.

At block 19 of FIG. 1, the process includes spatializing, based on the position of the head and the one or more locations of the one or more virtual speakers, one or more audio signals with a spatial renderer to generate spatialized audio signals. Spatializing the audio signals can include convolving each of the one or more audio signals with a head related impulse response (HRIR). It should be understood that this can be done in the frequency domain, e.g., converting the audio signals into frequency domain representations and multiplying the frequency domain signals with a head related transfer function (HRTF). In one aspect, the signals can be convolved with a binaural room impulse response (BRIR) to include acoustic features of the room, such as reverberation. Furthermore, it should be understood that spatialization can be performed with filters that spectrally shape the audio signals to add spatial cues. In one aspect, in addition to adding spatial cues, one or more filters of the spatial renderer are modified based on acoustic characteristics of a room that the television is located, to spatialized the sound as if the sounds are traveling in the room that the user is in. The acoustic characteristics of the room can be estimated during the initial process (e.g., calibration) by processing microphone signals that sense sound in the room and measuring acoustic characteristics such as reverberation of the room. Additionally or alternatively, the acoustic characteristics of the room can be estimated based on the geometry of the room and of objects in the room (e.g., scattering caused by objects in the room and absorption coefficients of surfaces of the room).

At block 20, the process includes driving a left speaker and a right speaker of a headphone set. The speakers can include electro-acoustic transducers that convert electrical signals to sound. The spatialized audio signals can be converted to sound that is perceived by the user to be located at the one or more locations of the one or more virtual speakers.

In one aspect, block 16 (determining the location of the television and/or mapping the room or environment of the television), and block 17 (assigning the one or more locations of the one or more virtual speakers) can be performed during an initial process (e.g., a calibration process).

In one aspect, block 18 (determining/tracking the position of the head) and block 19 (spatializing the one or more audio signals) can be performed repeatedly in real-time during playback of the one or more audio signals. Thus, the process does not have to continuously recalculate a location and geometry of the television or the room geometry, which can be computationally costly and unnecessary unless the TV is moved to a different location. The process, however, can continuously track changing positions of the head and spatialize the one or more audio signals during playback based on changing positions of the head.

Multiple Users

In one aspect, the process shown in FIG. 1 can be repeated for multiple users in the same listening area. For example, separate sets of one or more virtual speakers can be generated and assigned to multiple users, each wearing a headphone set. The assignment of locations of the virtual speakers can be the same, or different from one user to the other. In other words, one of the one or more virtual speakers of a first user can have a location that is different from any and all of the one or more locations of the one or more virtual speakers of a second user. For example, FIG. 3 shows a user 1 that can be listening to virtual speakers 63, 62, 64, 65 and 66 which have been generated for user 1. A second user (user 2) can have assigned a separate set of virtual speakers having the same location (e.g., 63, 62, and 64) but also having different assigned locations such as speakers 67 and 69. The heads of users 1 and 2 can be tracked independently to continuously update the spatializing of the audio signals of user 1 and 2, independently.

Optimization of Speaker Placement

Figure 4:
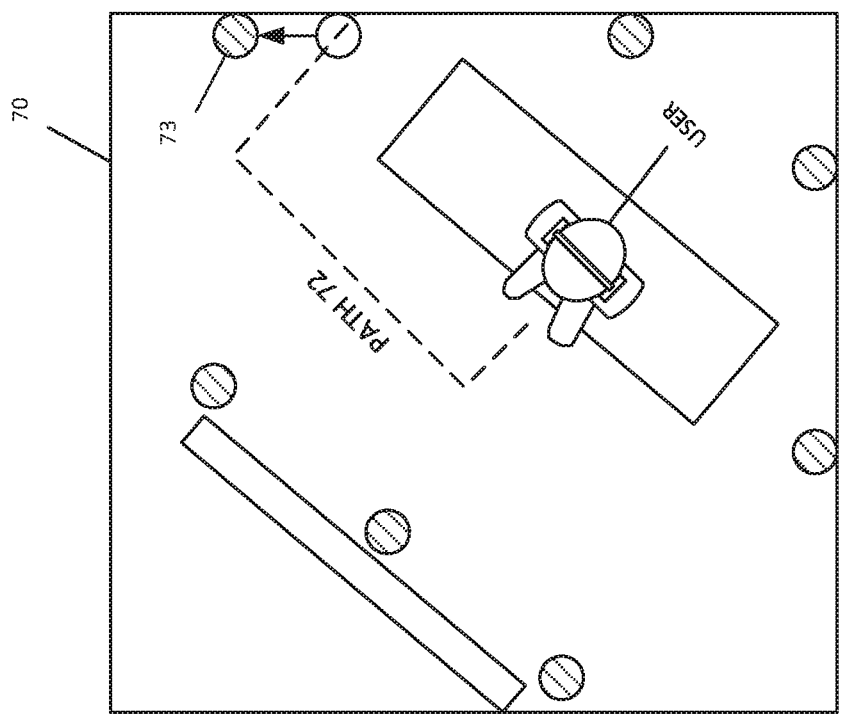
FIG. 4 illustrates features of virtual speakers in a listening area, according to one aspect.

In one aspect, speaker placement of the one or more virtual speakers is optimized when assigning the locations. The optimization can be performed based on a history of a location of the user location. For example, referring to FIG. 4, a user's location history can be tracked and stored when tracking the user's head. If it is shown that a user often travels along a path 72 then the virtual speaker 73 can be moved to prevent situations where the user would walk 'through' the virtual speaker (which could cause loudness and discomfort to the user). Similarly, as shown in FIG. 3, based on the analysis of the room geometry, a speaker 65 can be moved to avoiding hallways, windows, or other openings of the room. Thus, a user will not walk through a speaker, nor will sound appear to be coming from a window or open hallway, which can sound unnatural.

In one aspect, a speaker can be adjusted to be beyond a wall of the room, based on a location of the user relative to the speaker. For example, in FIG. 3, the location of the user 2 can be estimated based on historical usage, e.g., the user always sits at a right end of a couch. Rather than place speaker 69 at the wall of the room, the location can be moved slightly farther along the wall or beyond the wall to increase a distance between the user and the virtual speaker. If the speaker is too close to the user, it can mask the other speakers and cause the user discomfort. By increasing the distance between the virtual speaker and the user, this can be prevented. In one aspect, a minimum threshold distance can be maintained between a user and a virtual speaker, such that if the distance is smaller than the minimum threshold, then the speaker location can be adjusted along the wall or beyond the wall to maintain the minimum distance between the user and the virtual speaker. Optimization of the speaker locations can be done at run-time and/or at the calibration stage.

System Example

Figure 2:
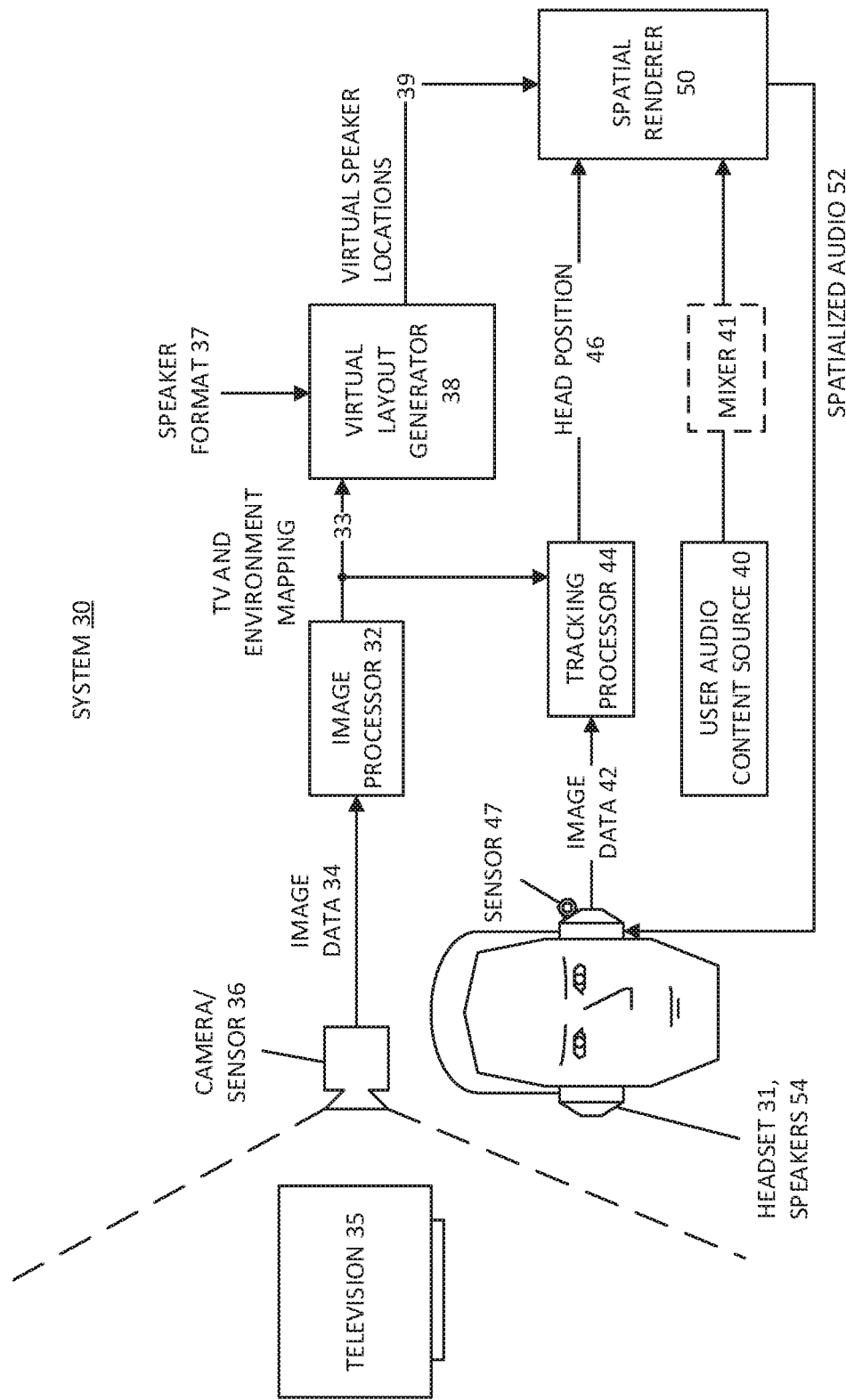
FIG. 2 illustrates an audio system with speaker virtualization, according to one aspect.

An audio system 30 is shown for virtualizing speakers through a headset in FIG. 2. A sensor (e.g., one or more cameras) 36 can generate image data 34 that can includes images of a television 35 and the environment of the television (e.g., a room, a backyard, etc.). An image processor 32 can, using computer vision technologies, recognize the television and the environment, and generate a map 33 of the television in the environment. As discussed in other sections, the television can be driven to display a known image or pattern during the calibration stage to better identify the location and dimensions of the television in the images.

A virtual layout generator 38 can use the mapping of the television and the environment to assign locations to one or more virtual speakers within the environment. At least one of those virtual speakers can be located at the television so that the user can hear sounds coming from the television, thereby providing a natural listening experience.

A sensor 47 (e.g., one or more cameras) of a headset 31 can generate image data 42 that can be processed by a tracking processor 44 to track a position of a user's head. As discussed in other sections, computer vision and known tracking algorithms can be used by the tracking processor to track the user's head. The tracking processor can use the mapping of the TV and TV environment as a reference to track the user's head. For example, if the TV is within view of the sensor and contained in the image, the location and angle of the television can provide a reference to determine the position of the user's head. Other objects or patterns recognized in the image data can also be used as reference.

A spatial renderer 50 can spatialize audio signals received from an audio content source 40. The content source can be a media player, a media server, a computing device, or other content providing means. In one aspect, the audio signals can be upmixed or downmixed by a mixer 41. For example, one or more audio signals from the audio content source can be mixed to a desired audio format, for example, 5.1 surround, 7.1 surround, or other configurations.

The spatial renderer 50 can spatialize the audio signals with HRIR, BRIR or their frequency domain counterparts, where the impulse responses characterize the effects of sound based on locations of the user, and corresponding virtual speakers, and can include room impulse response. It should be understood that the spatializing can be performed through filtering of different frequency bands of the audio signals where filter coefficients are based on the impulse responses.

The spatial renderer 50 can generate the spatialized audio 52, which can be communicated to speakers 54 of the headset 31 to generate sound that, when heard by the user, appear to come from the one or more virtual speaker locations.

System Architecture

Figure 5:
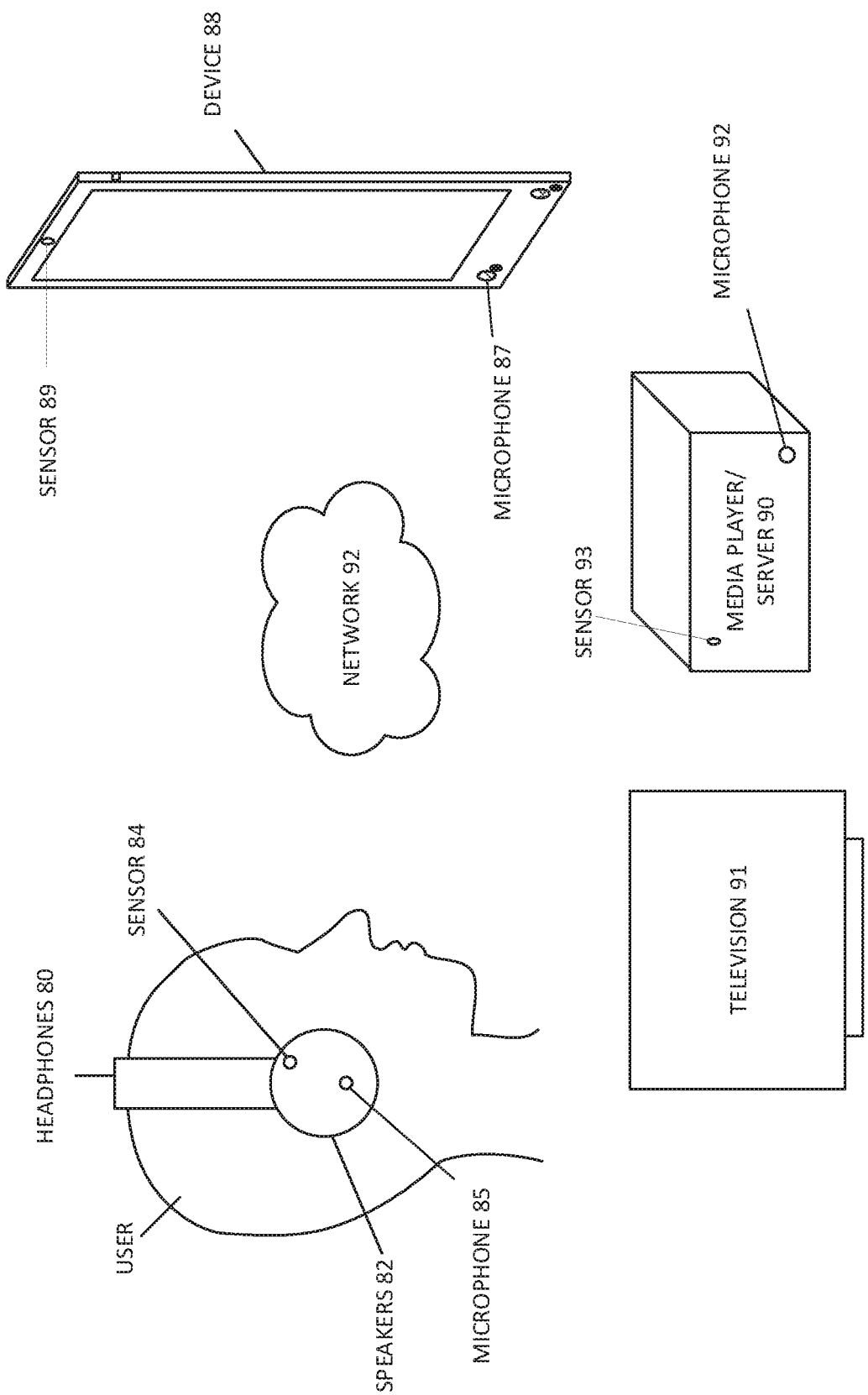
FIG. 5 illustrates system hardware, in one aspect.

The various features of the method and system described can be performed by in different configurations. For example, as shown in FIG. 5, the calibration (mapping the television and room) can be performed by a sensor 89 of a device 88. The device can be a laptop computer, mobile phone, or tablet computer. The calibration step can also be performed by a sensor 84 that is integrated with the headphones 80. In one aspect, even a media player 90 that is local to the television and television environment can have a sensor 93 (e.g., one or more cameras) that can be used to generate images to analyze for mapping the environment of the television and assignment and optimization of the virtual speakers. A media player can be an analog or digital media player that receives audio and visual content from different sources (e.g., the internet, compact disc, DVD, etc.).

In one aspect, microphones 85, 87 and 92 of the various devices can also sense sounds in the environment. The microphone signals can be processed to determine/measure acoustic characteristics of the television environment (e.g., reverberation, sound absorption coefficients of surfaces in the room). The acoustic characteristics can be determined during an initial process (e.g., calibration) and then used when spatializing the audio signals. Acoustic cues based on the televisions real physical environment can thus be included in the spatialized audio signals to provide a natural listening experience.

In one aspect, the media player 90 or device 88 is the content provider. The media player/device can a) stream video data to a television 91 and b) generate and stream spatialized audio data to the headphone 80. For example, the sensor 84 of the headphone can generate image data in real-time and communicate this to the media player/device. The media player/device can continuously process the real time image data to track the user's head and spatialize the audio data. The spatialized audio data is communicated to the headphones 80 to be played back through speakers 82.

As discussed earlier, a 'television' can include other display means, such as a projector, laptop, tablet computer, computer monitor, etc. Aspects described with regard to the television also apply to other display means. For example, the device 88 can render video content on its own display. In such a case, the display would be treated as a television and aspects of this disclosure with regard to the television would also apply to the display (e.g., recognizing and mapping the display in the environment and assigning locations of virtual speakers based on the display location and size).

In one aspect, rather than communicating the images from the headphones to a separate device (e.g., the media server 90 or the device 88), the headphones can also process the images for head tracking and/or spatialize the audio signals received from a media player.

The various devices (e.g., 80, 88, 92, and 91) of FIG. 5 can communicate over a network 92. The network here does not have to singular and can be any combination of communication means including the internet, TCP/IP, WiFi, Ethernet, Bluetooth, etc.

FIG. 6 shows a block diagram of audio processing system hardware, in one aspect, which may be used with any of the aspects described herein (e.g., headphone set, mobile device, media player, or television). This audio processing system can represent a general purpose computer system or a special purpose computer system. Note that while FIG. 6 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 6 is not intended to represent any particular architecture or manner of interconnecting the components as such details are not germane to the aspects herein. It will also be appreciated that other types of audio processing systems that have fewer components than shown or more components than shown in FIG. 6 can also be used. Accordingly, the processes described herein are not limited to use with the hardware and software of FIG. 6.

As shown in FIG. 6, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Camera 158 and display 160 can be coupled to the bus.

Memory, although not shown in FIG. 6, can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "analyzer", "separator", "renderer", "estimator", "combiner", "synthesizer", "controller", "localizer", "spatializer", "component," "unit," "module," and "logic", "extractor", "subtractor", "generator", "optimizer", "processor", "mixer", and "simulator" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method of virtualizing speakers, comprising:
   determining a location of a display including detecting the display in one or more images generated by a camera;
   assigning locations of one or more virtual speakers based on the location of the display, wherein the one or more virtual speakers include a first virtual speaker located at the display;

determining a position of a head of a user; and spatializing, based on the position of the head and the locations of the one or more virtual speakers, one or more audio signals with a spatial renderer to generate spatialized audio signals that, when used to drive a left speaker and a right speaker of a headphone set, are converted to sound that is perceived by the user to be located at the assigned locations of the one or more virtual speakers.

2. The method of claim 1, further comprising determining a geometry of a room that the display is located, wherein assigning the locations of the one or more virtual speakers includes comparing dimensions of the display with the geometry of the room to optimize the locations of the one or more virtual speakers.

3. The method of claim 2, wherein the one or more virtual speakers includes a second speaker having a location at a wall of the room that is at a side, behind, or above an estimated location of the user.

4. The method of claim 1, wherein the camera is integrated with the headphone set.

5. The method of claim 4, wherein determining the location of the display includes processing the one or more images with an object detection algorithm to recognize the display in the one or more images.

6. The method of claim 1, wherein the one or more virtual speakers includes a second virtual speaker located at a right edge of the display, and a third virtual speaker located at a left edge of the display.

7. The method of claim 1, wherein the first virtual speaker is located at a center of the display, and the one or more virtual speakers includes a second virtual speaker located at a right edge of the display, a third virtual speaker located at a left edge of the display, a fourth virtual speaker located at a right side or behind an estimated location of the user, and a fifth virtual speaker located at a left side or behind the estimated location of the user.

8. The method of claim 1, wherein determining the position of the head includes generating one or more images with a camera of the headphone set and analyzing the one or more images to determine a location and orientation of the head.

9. The method of claim 8, wherein the device is a media server that receives the one or more images from the headphone set over a networked connection.

10. The method of claim 8, wherein determining the position of the head includes recognizing, in the one or more images, the display, and using the display as a reference to calculate a location and orientation of the head.

11. The method of claim 10, wherein visual information that is displayed on the display is compared to received visual information to help in recognizing the display in the one or more images when determining the position of the head.

12. The method of claim 1, further comprising generating a map of a room where the display is located, based on analyzing one or more images, the map including a display location and geometry of the room; and using the map as a reference when determining the position of the head of the user.

13. The method of claim 1, further comprising repeating the method for a different user in the same listening area as the user, wherein one of the one or more virtual speakers of the different user has a location that is different from any of the locations of the one or more virtual speakers of the user.

14. The method of claim 1, wherein determining the location of the display and assigning the locations of the one or more virtual speakers is performed during an initial process, and determining the position of the head and spatializing the one or more audio signals is performed repeatedly and concurrent with the playback of the one or more audio signals, to continuously track changing positions of the head and spatialize the one or more audio signals based on the changing positions of the head.

15. The method of claim 1, further comprising upmixing the one or more audio signals, wherein spatializing is performed on the upmixed versions of the one or more audio signals.

16. The method of claim 1, wherein one or more filters of the spatial renderer are modified based on acoustic characteristics of a room that the display is located.

17. The method of claim 1, wherein placement of the one or more virtual speakers is optimized based on a history of user location or avoiding hallways, windows, or other openings of a room that the display is located.

18. The method of claim 1, wherein placement of a specified virtual speaker of the one or more virtual speakers is adjusted to be beyond a wall of a room that the display is located, based on the location of the user relative to the specified one of the one or more virtual speakers, to increase a distance between the user and the specified virtual speaker.

19. A system for virtualizing speakers, comprising:

a processor; and non-transitory memory having stored therein a plurality of instructions, that when executed by the processor, perform the following:

determining a location of a display including detecting the display in one or more images generated by a camera;

assigning locations of one or more virtual speakers based on the location of the display, wherein the one or more virtual speakers include a virtual speaker located at the display;

determining, in real-time, a position of a head of a user; and spatializing, based on the real-time position of the head relative to the locations of the one or more virtual speakers, one or more audio signals with a spatial renderer to generate spatialized audio signals that, when used to drive a left speaker and a right speaker of a headphone set, are converted to sound that is perceived by the user to be located at the assigned locations of the one or more virtual speakers.

20. An article of manufacture, comprising:

a processor; and non-transitory memory having stored therein a plurality of instructions, that when executed by the processor, perform the following:

determining a location of a display including detecting the display in one or more images generated by a camera;

assigning locations of one or more virtual speakers based on the location of the display, wherein the one or more virtual speakers include a virtual speaker located at the display;

determining, in real-time, a position of a head of a user, based on a stream of tracking data; and spatializing, based on the real-time position of the head relative to the locations of the one or more virtual speakers, one or more audio signals with a spatial renderer to generate spatialized audio signals that, when used to drive a left speaker and a right speaker of a headphone set, are converted to sound that is perceived by the user to be located at the assigned locations of the one or more virtual speakers, wherein the camera is separate from the headphone set.

\* \* \* \* \*